United States Patent [19]
Kinter

[11] Patent Number: 6,062,496
[45] Date of Patent: May 16, 2000

[54] VALVE CARTRIDGE HAVING PRESSURE SENSOR FOR AGRICULTURE AND WEED CONTROL

[75] Inventor: Malcolm L Kinter, Sunnyvale, Calif.

[73] Assignee: Patchen, Inc., Ukiah, Calif.

[21] Appl. No.: 09/093,950

[22] Filed: Jun. 8, 1998

Related U.S. Application Data

[63] Continuation-in-part of application No. 08/664,600, Jun. 17, 1996, Pat. No. 5,833,144.

[51] Int. Cl.⁷ ........................................................ B05B 1/14
[52] U.S. Cl. ........................ 239/462; 239/575; 239/590.3
[58] Field of Search .................................... 239/159, 172, 239/590, 590.3, 590.5, 575, 553, 553.3, 553.5, 462, 600, 162, 71, 77; 210/222, 695

[56] References Cited

U.S. PATENT DOCUMENTS

| | | | |
|---|---|---|---|
| 2,514,405 | 7/1950 | Marihart | 250/239 |
| 2,682,132 | 6/1954 | Marihart | 47/1 |

(List continued on next page.)

FOREIGN PATENT DOCUMENTS

| | | |
|---|---|---|
| 231270 | 12/1985 | German Dem. Rep. . |
| 229625 | 5/1991 | New Zealand . |
| 203340 | 12/1967 | Russian Federation . |
| 471074 | 6/1973 | Russian Federation . |
| 382367 | 8/1973 | Russian Federation . |
| 547183 | 4/1977 | Russian Federation . |
| 968631 | 4/1981 | U.S.S.R. . |
| 1377606A1 | 2/1988 | U.S.S.R. . |
| 590598 | 7/1947 | United Kingdom . |
| 2 200446A | 8/1988 | United Kingdom . |
| WO84/00211 | 1/1984 | WIPO . |

OTHER PUBLICATIONS

Proceedings of the 1991 Symposium, American Society of Agricultural Engineers, W. L. Felton et al., "*A Microprocessor Controlled Technology To Selectively Spot Spray Weeds*", 8 pages (Dec. 16–17, 1991).

B. B. Nitsch et al., "Visible and Near Infrared Plant, Soil And Crop Residue Reflectivity For Weed Sensor Design", American Society of Argicultural Engineers, (Jun. 23–26, 1991).

Geoffrey J. Shropshire et al., "Fourier and Hadamard Transforms For Detecting Weeds in Video Imgaes", pp. 1–18, American Society of Agricultural Engineers, (Dec. 12–15, 1989.)

Geoffrey J. Shropshire et al., "Optical Reflectance Sensor for Detecting Plants", SPIE vol. 1379, pp. 222–235, (1990).

"Selective Sprayer", Cotton Farming, 1 page. (No. date given).

(List continued on next page.)

*Primary Examiner*—Andres Kashnikow
*Assistant Examiner*—Lisa Ann Douglas
*Attorney, Agent, or Firm*—Skjerven, Morrill, MacPherson, Franklin & Friel, LLP; Alan H. MacPherson; Gary J. Edwards

[57] ABSTRACT

An agricultural spray implement includes a plurality of removable valve/filter/nozzle cartridges. Each removable cartridge has a housing that retains a high speed solenoid valve and a spray nozzle. When the solenoid valve is open, an agricultural liquid (for example, herbicide) flows through the solenoid valve, through a chamber in the housing, and through the nozzle. To monitor cartridge operation and/or to detect cartridge failures (for example, a solenoid valve that is stuck open or closed or a nozzle that is clogged), a pressure sensor is provided that detects a pressure in the chamber. A chamber pressure that does not change when the solenoid valve is controlled to open and/or close is indicative of cartridge failure. Operation of each of the many spray cartridges of the agricultural spray implement is monitored from a single display.

18 Claims, 9 Drawing Sheets

U.S. PATENT DOCUMENTS

| | | | |
|---|---|---|---|
| 2,894,178 | 7/1959 | Chesebrough et al. | 317/130 |
| 3,373,870 | 3/1968 | Black et al. | 209/111.6 |
| 3,488,511 | 1/1970 | Mori et al. | 250/226 |
| 3,512,587 | 5/1970 | Shader | 172/57 |
| 3,590,925 | 7/1971 | Troutner | 176/6 |
| 3,609,913 | 10/1971 | Rose | 47/1.43 |
| 3,652,844 | 3/1972 | Scott, Jr. | 240/1 |
| 3,701,218 | 10/1972 | Priest | 47/1.43 |
| 3,737,032 | 6/1973 | Burkitt | 209/10 |
| 3,821,550 | 6/1974 | Priest | 250/226 |
| 3,910,701 | 10/1975 | Henderson et al. | 356/39 |
| 3,974,964 | 8/1976 | Pearce et al. | 239/553.3 |
| 4,013,875 | 3/1977 | McGlynn | 235/150.2 |
| 4,015,366 | 4/1977 | Hall, III | 47/1 |
| 4,029,391 | 6/1977 | French | 350/96 |
| 4,092,800 | 6/1978 | Wayland, Jr. et al. | 47/1.3 |
| 4,179,216 | 12/1979 | Theurer et al. | 356/4 |
| 4,206,569 | 6/1980 | Randolph | 47/1.7 |
| 4,354,339 | 10/1982 | Nokes | 56/10.2 |
| 4,369,886 | 1/1983 | Lane et al. | 209/564 |
| 4,406,411 | 9/1983 | Gall et al. | 428/577 |
| 4,416,586 | 11/1983 | Diederich et al. | 417/13 |
| 4,482,960 | 11/1984 | Pryor | 364/424 |
| 4,527,897 | 7/1985 | Okabe | 356/407 |
| 4,550,526 | 11/1985 | Smucker | 47/1.5 |
| 4,558,786 | 12/1985 | Lane | 209/558 |
| 4,570,858 | 2/1986 | Bintner et al. | 239/390 |
| 4,618,257 | 10/1986 | Bayne et al. | 356/71 |
| 4,623,510 | 11/1986 | Troy | 376/272 |
| 4,626,993 | 12/1986 | Okuyama et al. | 364/424 |
| 4,628,454 | 12/1986 | Ito | 364/424 |
| 4,630,773 | 12/1986 | Ortlip | 239/1 |
| 4,674,048 | 6/1987 | Okumura | 364/424 |
| 4,699,273 | 10/1987 | Suggi-Liverani et al. | 209/580 |
| 4,709,265 | 11/1987 | Silverman et al. | 358/109 |
| 4,709,505 | 12/1987 | Lempa, Jr. | 47/1.7 |
| 4,738,799 | 4/1988 | Troy | 252/633 |
| 4,744,207 | 5/1988 | Hanley et al. | 56/16.6 |
| 4,768,713 | 9/1988 | Roper | 239/77 |
| 4,768,715 | 9/1988 | Sali et al. | 239/166 |
| 4,807,663 | 2/1989 | Jones | 239/553.3 |
| 4,811,905 | 3/1989 | Ishikawa et al. | 239/590.3 |
| 4,878,598 | 11/1989 | Ruschhaupt, Jr. | 222/1 |
| 4,936,543 | 6/1990 | Kamibayasi | 254/129.15 |
| 4,946,589 | 8/1990 | Hayes | 210/222 |
| 4,961,561 | 10/1990 | Kamibayasi | 251/120 |
| 4,991,341 | 2/1991 | Douglas | 47/1.7 |
| 5,015,868 | 5/1991 | Park | 250/561 |
| 5,021,160 | 6/1991 | Wolpert | 210/500 |
| 5,021,645 | 6/1991 | Satula et al. | 250/223 |
| 5,050,771 | 9/1991 | Hanson et al. | 222/1 |
| 5,068,540 | 11/1991 | Tsuji | 250/561 |
| 5,072,128 | 12/1991 | Hayano et al. | 250/572 |
| 5,109,161 | 4/1992 | Horiuchi et al. | 250/561 |
| 5,113,892 | 5/1992 | Hull et al. | 137/62 |
| 5,133,382 | 7/1992 | Nielsen | 137/549 |
| 5,134,961 | 8/1992 | Giles et al. | 239/71 |
| 5,137,629 | 8/1992 | Dauchez | 210/222 |
| 5,144,767 | 9/1992 | McCloy et al. | 47/1.7 |
| 5,176,322 | 1/1993 | Sartor | 239/77 |
| 5,222,324 | 6/1993 | O'Neall et al. | 47/1.7 |
| 5,232,155 | 8/1993 | Chen | 239/71 |
| 5,234,165 | 8/1993 | Rhyne, Jr. | 239/575 |
| 5,237,386 | 8/1993 | Harley | 356/338 |
| 5,238,192 | 8/1993 | McNair | 239/575 |
| 5,246,164 | 9/1993 | McCann et al. | 239/11 |
| 5,278,423 | 1/1994 | Wangler et al. | 250/561 |
| 5,296,702 | 3/1994 | Beck et al. | 239/226 |
| 5,319,196 | 6/1994 | Cleven | 250/231.13 |
| 5,335,863 | 8/1994 | DeGrace | 239/575 |
| 5,340,032 | 8/1994 | Stegmaier et al. | 239/575 |
| 5,386,285 | 1/1995 | Asayama | 356/356 |
| 5,389,781 | 2/1995 | Beck et al. | 250/226 |
| 5,507,115 | 4/1996 | Nelson | 47/1.7 |
| 5,585,626 | 12/1996 | Beck et al. | 250/222.1 |
| 5,591,339 | 1/1997 | Robinson | 210/499 |
| 5,647,994 | 7/1997 | Tunnanen et al. | 210/695 |
| 5,763,873 | 6/1998 | Beck et al. | 250/214 B |
| 5,789,741 | 8/1998 | Kinter et al. | 239/575 |
| 5,793,035 | 8/1998 | Beck et al. | 250/222.1 |
| 5,809,440 | 9/1998 | Beck et al. | 701/50 |
| 5,833,144 | 11/1998 | Kinter | 239/462 |
| 5,837,997 | 11/1998 | Beck et al. | 250/227.11 |
| 5,911,362 | 6/1999 | Wood et al. | 239/1 |

OTHER PUBLICATIONS

"Sucker Punch", California Farmer, p. 18 (Feb. 1995).
"A New Age of Weed Control", Kelly Baron, The Grower, pp. 20–24 (Feb. 1993).
Patchen On Target, 4 pages (Fall 1994).
"The Newest Weedseeker is a Hit", Patchen On Target, 4 pages, (Spring 1995).
"Waging War on Weeds", Grape Grower, Marni Katz, vol. 27, No. 9, 4 pages (Sep. 1995).
Patchen Selective Spray System, PhD600–Row Crops, 2 pages (Feb. 1996).
Patchen Selective Spray System, "A PhD600 Vineyard & Orchard Spray System", 2 pages, (Mar. 1996.)
"Controls for liquid, Gas Air and Vacuum", KIP Catalog, Oct. 1993 p.17.
Patchen On Target, 4 pages (Winter 1993).
Patchen Selective Spray Systems, "Reduced Herbicide Usage is Perennial Crops, Row Crops, Fallow Land and Non–Agricultural Applications Using Optoelectronic Detection", 10 pages, (1994).
Patchen On Target, 4 pages (Spring 1994).
Patchen Selective Spray System, PhD600–Trees and Vines, 2 pages (Jul. 1996).
Patchen Selective Spray System, Stop Spraying Dirt Start Spraying Weeds, 4 pages (Nov. 1996).
Patchen Selective Spray System, Cut Chemical Costs Today!, 4 pages (Nov. 1996).
Patchen Selective Spray System, Put A Stop To Rising Weed Control Costs!, 4 pages (Feb. 1997).
SenSym "Solid–State Pressures Sensors Handbook", vol. 15, pp. iii–vi, 1–3 through 1–8, 8–51 through 8–54, and 8–66 through 8–77 (1996).

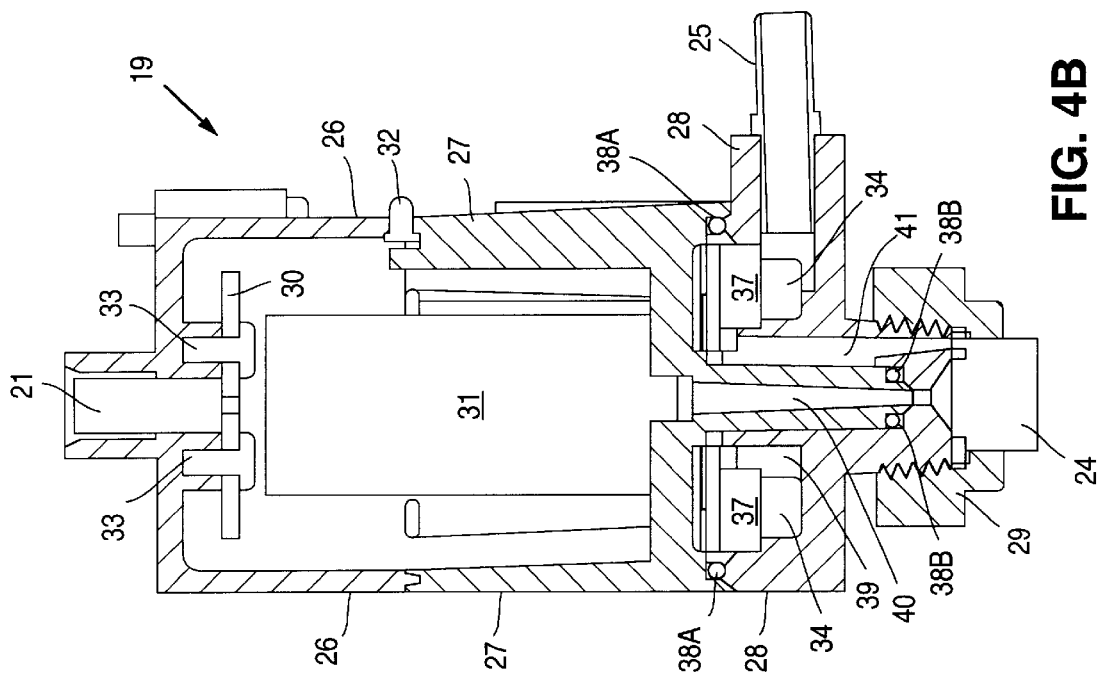
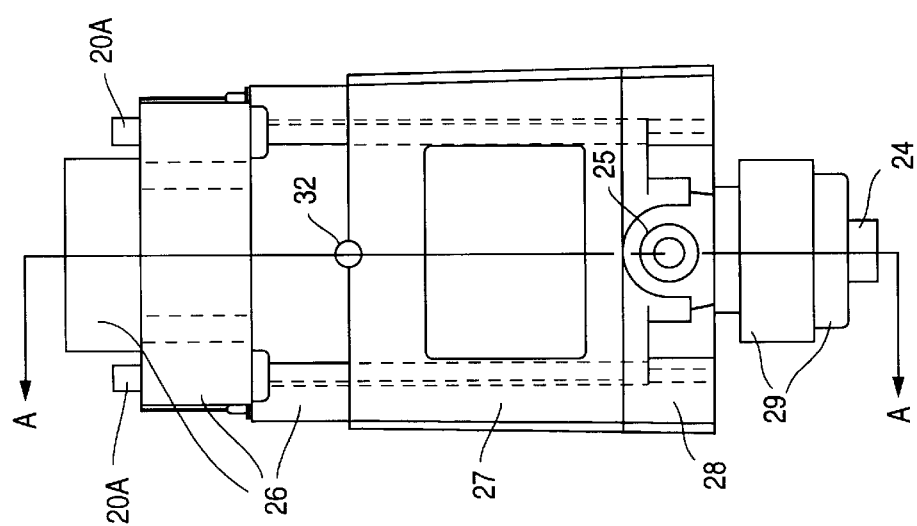

| SOLENOID COMMAND | SENSOR READING | FLOW STATUS | COMMENT |
|---|---|---|---|
| CLOSED | BELOW SET POINT | OK | VALVE OFF NORMAL |
| CLOSED | ABOVE SET POINT | ERROR | VALVE STUCK ON |
| OPEN | BELOW SET POINT | ERROR | VALVE STUCK OFF |
| OPEN | ABOVE SET POINT | OK | VALVE ON NORMAL |

VALVE CARTRIDGE HAVING PRESSURE SENSOR FOR AGRICULTURE AND WEED CONTROL

CROSS-REFERENCE TO RELATED APPLICATION

This application is a continuation-in-part of U.S. patent application Ser. No. 08/664,600 entitled "HIGH SPEED SOLENOID VALVE CARTRIDGE FOR SPRAYING AN AGRICULTURAL LIQUID IN A FIELD", filed Jun. 17, 1996, now U.S. Pat. No. 5,833,144.

FIELD OF THE INVENTION

This invention relates to agriculture and weed control. More particularly, this invention relates to a high speed solenoid valve cartridge for spraying a liquid (for example, herbicide).

BACKGROUND INFORMATION

U.S. Pat. No. 5,296,702 discloses techniques whereby an apparatus transmits radiation toward an object, receives the reflected radiation, and thereby obtains a spectral reflectance characteristic of the object. Because the spectral reflectance characteristic of a living plant differs from that of soil, weeds growing in a field can be differentiated from soil in the field. When the apparatus detects a spectral reflectance characteristic of a living plant, a high speed solenoid valve is opened allowing herbicide to flow to a spray nozzle and to spray the weed. When the apparatus no longer detects a spectral characteristic of a living plant, the solenoid valve is closed and herbicide is not sprayed onto the bare soil. Use of such an apparatus in spraying weeds in a field results in considerable herbicide savings because herbicide is not wasted on the bare soil.

FIG. 1 (Prior Art) is a simplified block diagram of a sprayer apparatus 1 which puts into practice the above described technique. Herbicide 2 is pumped by a pump 3 from a reservoir 4, through tubing 5, to a plurality of electronically controlled solenoid valves 6 and spray nozzles 7. A system filter 8 (for example, a 50 to 100 mesh filter) in a filter housing 9 is disposed between the reservoir and the pump to prevent particles from passing into the pump and from clogging the solenoid valves and spray nozzles.

When farmers used the sprayer apparatus, however, problems were encountered. Water (for example, water obtained from a ditch which may have appeared clear to the farmer) was put into the reservoir and was mixed with herbicide concentrate to make the needed liquid herbicide. When the sprayer apparatus stopped operating properly due to inadequate flow of herbicide to the spray nozzles, it was determined, perhaps due to the water having appeared clear when it was put in the reservoir, that the filter 8 could be removed and the sprayer would continue to operate. The system filter 8 was removed from housing 9 and spraying was resumed without system filter 8. Unfortunately, small particles present in the water then clogged the solenoid valves. Considerable effort was then required to clean the numerous solenoid valves. In some cases, catastrophic failures of solenoid valves occurred and the solenoid valves had to be replaced.

SUMMARY

An agricultural spray implement includes a plurality of removable valve/filter/nozzle cartridges. Each removable cartridge has a single housing that retains a magnetized filter, a high speed solenoid valve, and a spray nozzle. In the event the system filter of the spray implement is removed, fine particles which otherwise might clog the solenoid valves are stopped from entering the solenoid valves by the magnetized filters of the valve/filter/nozzle cartridges. Each cartridge has a clean-out purge valve so that its magnetized filter can be unclogged without removal of the magnetized filter from the cartridge housing. A light emitting diode of the cartridge provides a visual indication that the cartridge is dispensing agricultural liquid. The light emitting diode is turned on when the solenoid valve is controlled to be open. In some embodiments, the light emitting diode is not supplied with current until after the solenoid valve has opened and only a smaller holding current is needed to hold the solenoid valve open.

In another embodiment, a spray implement includes a plurality of removable valve cartridges. Each removable cartridge has a housing that retains a high speed solenoid valve and a spray nozzle. When the solenoid valve is open, a liquid (for example, herbicide) flows through the solenoid valve, through a chamber in the housing, and through the nozzle. To detect failures of the valve cartridge (for example, a solenoid valve that is stuck open or closed or a nozzle that is clogged), a pressure sensor is provided that detects a pressure in the chamber. A chamber pressure that does not change when the solenoid valve opens and/or closes is indicative of a cartridge failure. The spray implement has a display unit for monitoring the operation of the numerous valve cartridges.

In addition to finding use in agriculture, the spray implement finds use in weed control such as along railroad tracks, highways and runways.

This summary does not purport to define the invention. The invention is defined by the claims.

BRIEF DESCRIPTION OF THE DRAWINGS

FIGS. 4A, 4B, 4C and 5 are views of a removable valve/filter/nozzle cartridge which fits into the detector/spray assembly of FIG. 3.

FIG. 10A is a diagram showing how an example of a cab control display may look in operation with some of its LCD sections on.

DETAILED DESCRIPTION OF THE PREFERRED EMBODIMENTS

Figure 2:
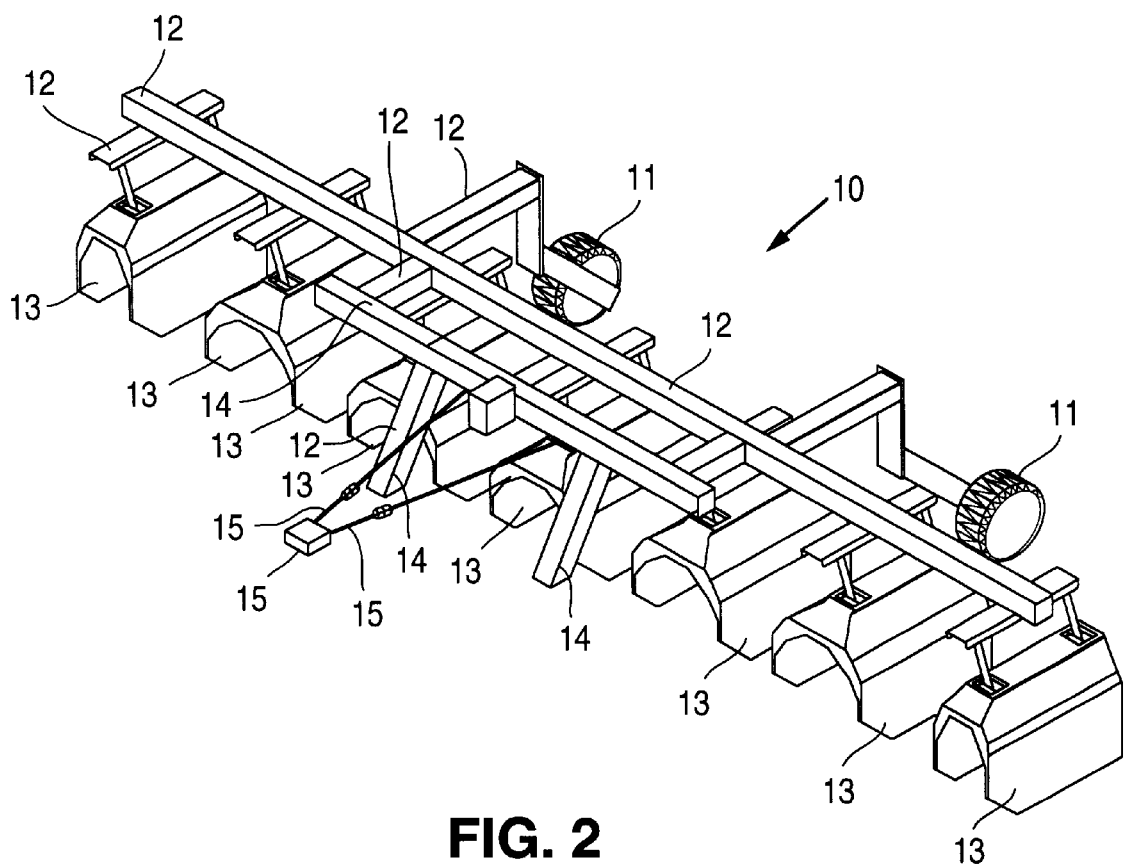
FIG. 2 is a simplified diagram of an agricultural implement in accordance with the present invention.

FIG. 2 is a simplified diagram of an agricultural implement 10 having a pair of wheels 11, a frame structure 12, a plurality of spray hoods 13, and a plurality of detector/spray assemblies 16 (not shown). The implement is attachable to a conventional three-point hitch of a tractor or other vehicle (not shown) using the pi-shaped structure 14 of the frame and the cable structure 15. Implement 10 may be used to spray weeds between the rows of cotton as set forth in U.S. Pat. No. 5,793,035 (the subject matter of which is incorporated herein by reference) entitled "Apparatus and Method for Spraying Herbicide on Weeds in a Cotton Field", filed Apr. 3, 1996. Techniques for distinguishing plants from soil disclosed in U.S. Pat. No. 5,789,741, entitled "Detecting Plants In A Field By Detecting A Change In Slope In A Reflectance Characteristic", filed Oct. 31, 1996, by Kinter and Beck (the subject matter of which is incorporated herein by reference), may be employed.

The hoods help prevent the spraying of the cotton plants in the rows with herbicide. The two outermost hoods contain two detector/spray assemblies 16 (not shown) each whereas the inner hoods contain three such assemblies each. Each detector/spray assembly detects plants (i.e. weeds) within a different ten inch swath of the field as the implement passes through the field. The tubing for conducting herbicide to the implement and the electrical connections to the implement are omitted to simplify the illustration.

Figure 3:
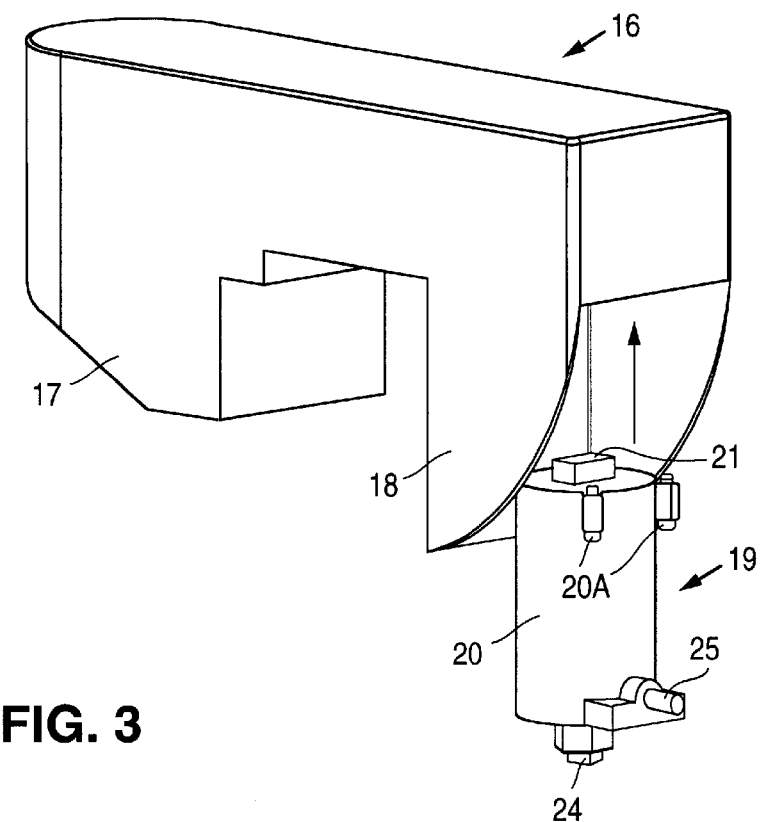
FIG. 3 is a simplified diagram of a detector/spray assembly of the agricultural implement of FIG. 2.

FIG. 3 is a simplified diagram of a detector/spray assembly 16. See U.S. Pat. No. 5,296,702 (the subject matter of which is incorporated herein by reference) for further details. The optics (the light emitting diodes, lenses, aperture plate, and photodetector) are disposed in portion 17. Light is transmitted downward from portion 17 and reflected light is received into portion 17. A portion 18 of the detector/spray assembly 16 is fashioned to receive a removable valve/filter/nozzle cartridge 19. The removable valve/filter/nozzle cartridge 19 includes a housing 20, an electrical connector 21, a high speed solenoid valve 31, a magnetized filter 36, a spray nozzle 24, and a tube inlet coupling 25. The electrical connector 21 of the removable cartridge 19 mates with a corresponding electrical connector (not shown) of detector/spray assembly 16 when the removable cartridge 19 is plugged into the accommodating receiving portion 18. Inlet coupling 25 is coupled to a tube which supplies an agricultural liquid (herbicide, pesticide, growth regulator or nutrient) to the removable cartridge 19. The removable cartridge 19 can be easily removed from the detector/spray assembly 16 by removing two bolts 20A, decoupling the tube from inlet coupling 25, and pulling the removable cartridge 19 from the receiving portion 18.

Figure 4C:
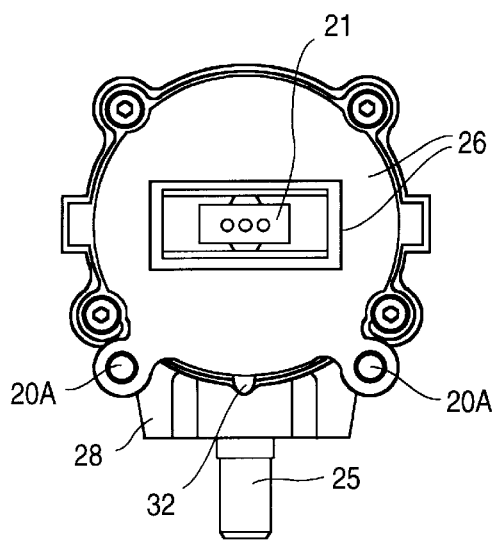
Figure 5:
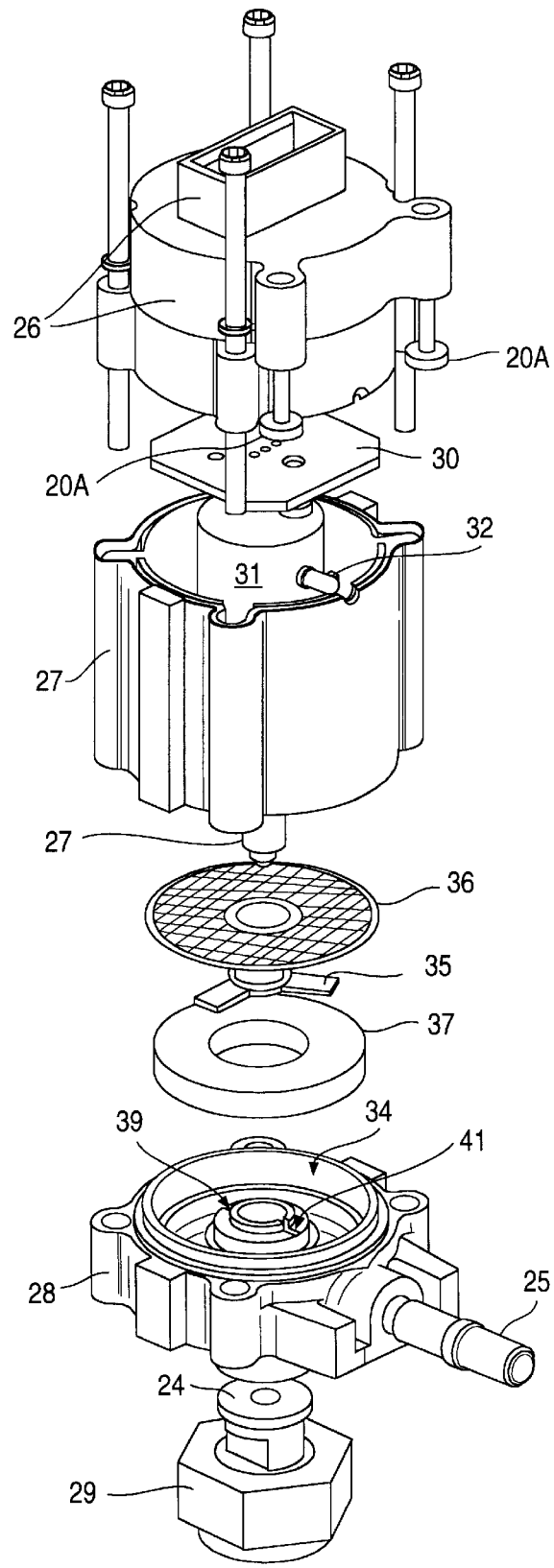

FIG. 4A is a sideview of the removable valve/filter/nozzle cartridge 19 of FIG. 3. FIG. 4B is a simplified cross-sectional view taken along line AA of FIG. 4A. FIG. 4C is a top down view of the removable valve/filter/nozzle cartridge 19 showing the connector 21 in further detail. FIG. 5 is an exploded view of the removable valve/filter/nozzle cartridge 19.

Housing 20 is made of injection molded plastic and includes four portions: 26, 27, 28 and 29. As shown in FIG. 4B, a printed circuit board 30 and high speed solenoid valve 31 are retained in a chamber formed by housing portions 26 and 27. Solenoid valve 31, in one embodiment, is a number 9X37, 0.062 orifice, 5 volt DC, 0.65 watt, 50 MOPD valve manufactured by KIP Incorporated of Farmington, Conn. Solenoid valve 31 opens in less than 10 milliseconds and closes in less than 10 milliseconds. Connector 21 and a light emitting diode 32 are fixed to printed circuit board 30. Printed circuit board 30 is fixed to housing portion 26 by two screws 33.

As shown in FIGS. 4B and 5, housing portions 27 and 28 form an annular chamber 34. A magnetized disk-shaped filter 36, a plastic spacer 35, and a permanent donut-shaped magnet 37 are retained by housing portions 27 and 28 such that filter 36 is magnetized by magnet 37. Spacer 35 separates magnet 37 from magnetized filter 36 so that there is more surface area of the filter through which agricultural liquid can flow. O-rings 38A and 38B (see FIG. 4B) are used to form a watertight seal between housing portions 27 and 28. A spray nozzle extension portion of housing portion 28 has threads which engage threads on housing portion 29 such that spray nozzle 24 is retained between housing portions 28 and 29. In one embodiment, spray nozzle 24 is a number 6502 nozzle (65 degrees of spray, outputs 0.2 gallons/minute at 40 PSI) available from TeeJet Spraying Systems Company of Wheaton, Ill.

The agricultural liquid (for example, herbicide in liquid form) enters inlet coupling 25, passes into annular chamber 34, up through a passage 39 extending in the axial dimension, and into a volume between the top of magnet 37 and the bottom of magnetized filter 36. The agricultural liquid then passes up through the filter 36 and into an annular volume between the top of filter 36 and a surface of housing portion 27. The liquid then passes up through slits (not shown) in the bottom of housing portion 27 and into corresponding passages in solenoid valve 31. When the solenoid valve 31 is open, the fluid passes out of an axial passage of solenoid valve 31, down through an axial passage 40 in a neck portion of housing portion 27, and through an orifice of spray nozzle 24. Of course, the flow of liquid from spray nozzle 24 is stopped when solenoid valve 31 is closed.

Figure 1:
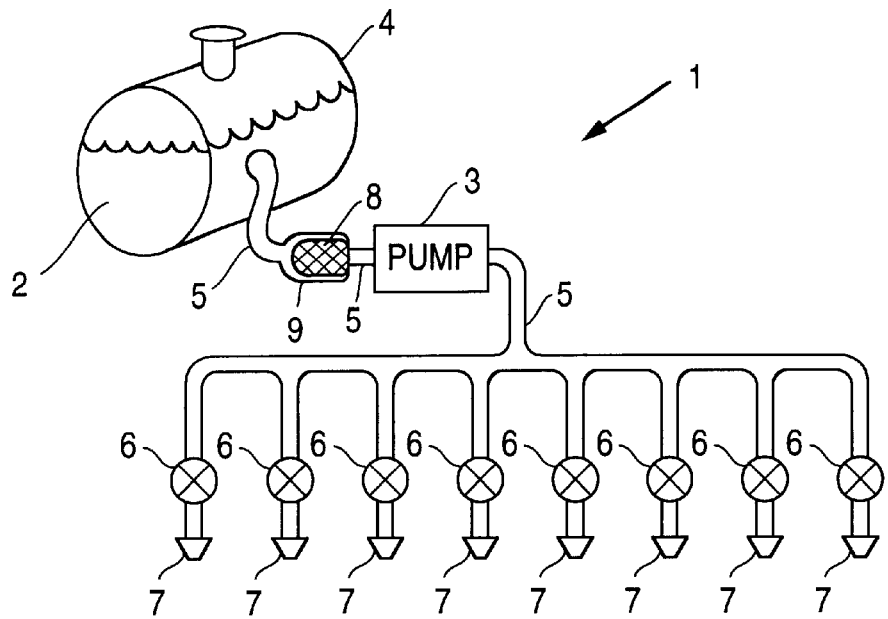
FIG. 1 (Prior Art) is a simplified block diagram of a sprayer apparatus.

Fine magnetic particles of a naturally occurring mineral called "magnetite" are often found in water supplies. Such fine magnetite particles may therefore be unknowingly introduced into the agricultural liquid when a farmer fills the implement reservoir (see FIG. 1) with water. Because the solenoid valves used in the electronic spraying of weeds are high speed and relatively precise mechanisms, they tend to be sensitive to plugging. It is believed that magnetic fields inside these solenoid valves (a solenoid valve is an electromagnetically actuated device) attract even the finest of magnetic particles and therefore clog the solenoid valves.

The placement of the filter 36 and the solenoid valve 31 together in one housing 20 protects the solenoid valves from clogging even if the farmer were to remove the system filter (see FIG. 1) thinking that the water used to mix the agricultural liquid were free of particles that could clog the system. If, for example, the system filter were removed, then very fine magnetite particles could be filtered out of the agricultural liquid passing into the solenoid valve by magnetized filter 36. In one embodiment, magnetized filter 36 is a photolithically etched metal filter having a 0.005 inch diameter pore size and is manufactured by E-Fab of Santa Clara, Calif. If the implement were operated without the system filter such that one of the removable valve/filter/nozzle cartridges 19 became clogged, then the farmer could not easily remove filter 36 without also removing the solenoid valve 31. Due to the provision of a clean-out purge passage, the farmer would likely use the clean-out purge feature to flush the filter 36 of clogging particles rather than disassembling the housing 20, removing the filter 36, reassembling the housing 20, and attempting to operate the solenoid valve without filter 36.

To flush filter 36 of clogging particles, a clean-out purge passage 41 is used. Housing portion 29 is unscrewed partially from housing portion 28 such that a top surface of spray nozzle 24 no longer blocks a bottom opening of purge passage 41. High pressure agricultural liquid then passes through inlet coupling 25, through annular chamber 34, up through passage 39, across the bottom surface (the clogged surface) of filter 36 in the volume provided by spacer 35, down axially extending purge passage 41 in housing portion 28, around loosened spray nozzle 24, and from the removable cartridge 19. This cleaning of filter 36 can be accomplished without unplugging the removable cartridge 19 from the spray implement 10 and without disassembling the removable cartridge 19.

Magnetized filter 36 may also serve to protect its solenoid valves from other contaminants such as rust and scale from the inside of the tubing between the system filter and the solenoid valves. Filter 36 may also provide protection in the event the system filter is incorrectly installed or a system filter with too large a mesh size is used. Filter 36 may also filter out weld spatter remaining after the manufacturing process.

When implement 10 is being used in a field, the detector/spray assemblies 16 generally do not output visible continuous streams of agricultural liquid. Nor is the operation of the solenoid valves typically audible over tractor noise. It may therefore be difficult for a farmer to determine if a detector/spray assembly 16 is in fact outputting agricultural liquid. Light emitting diode 32 therefore provides a visual indication indicative of the open state of the solenoid valve. In some embodiments, the actual flow of herbicide is monitored so that a more direct indication of the spraying of agricultural liquid is provided. Due to light emitting diode 32, a farmer using implement 10 can obtain a visual indication from a distance that the removable cartridges 19 are outputting agricultural liquid.

Figure 6C:
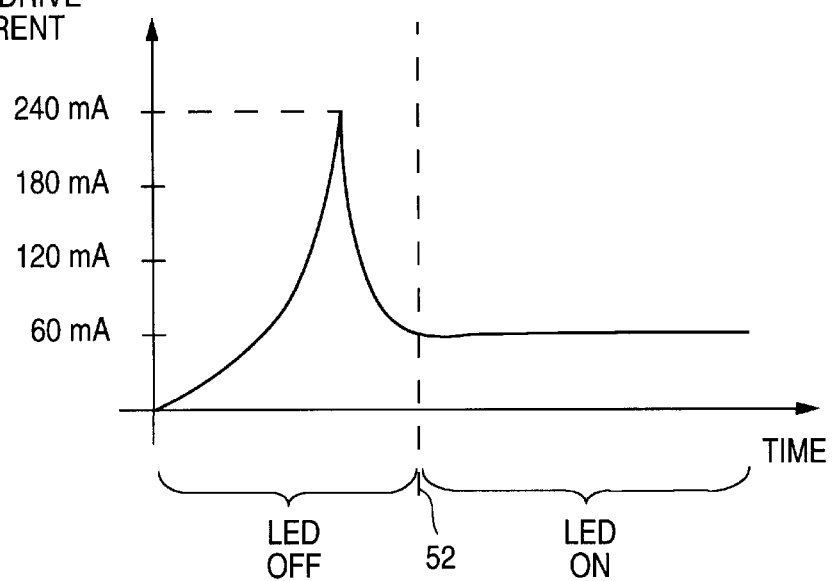
FIG. 6C is a simplified diagram illustrating how the solenoid valve of a valve/filter/nozzle cartridge is driven in accordance with some embodiments.
Figure 6A:
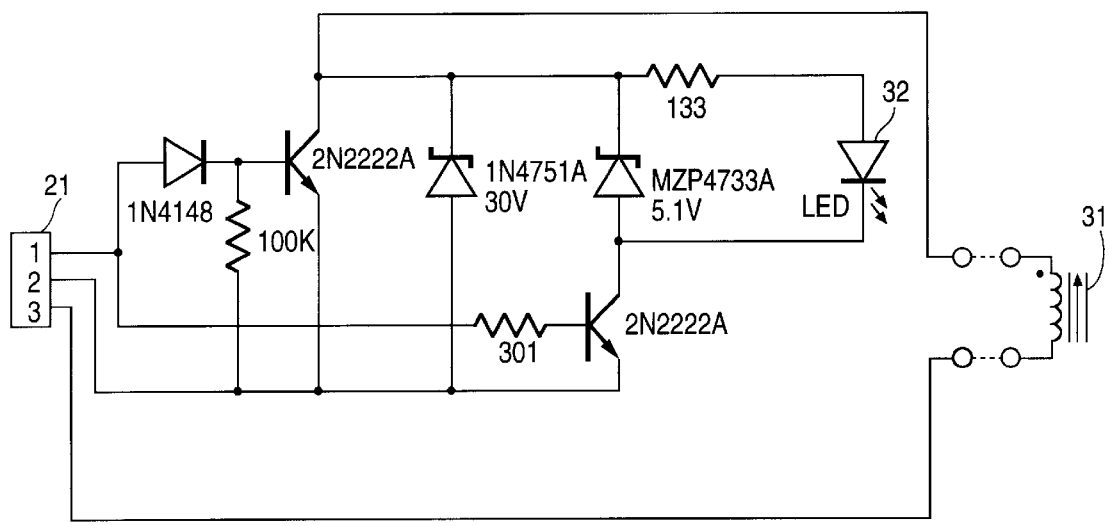
FIGS. 6A and 6B are schematic diagrams illustrating circuitry which drives the solenoid valve of the valve/filter/nozzle cartridge of FIGS. 4A, 4B, 4C and 5.
Figure 6B:
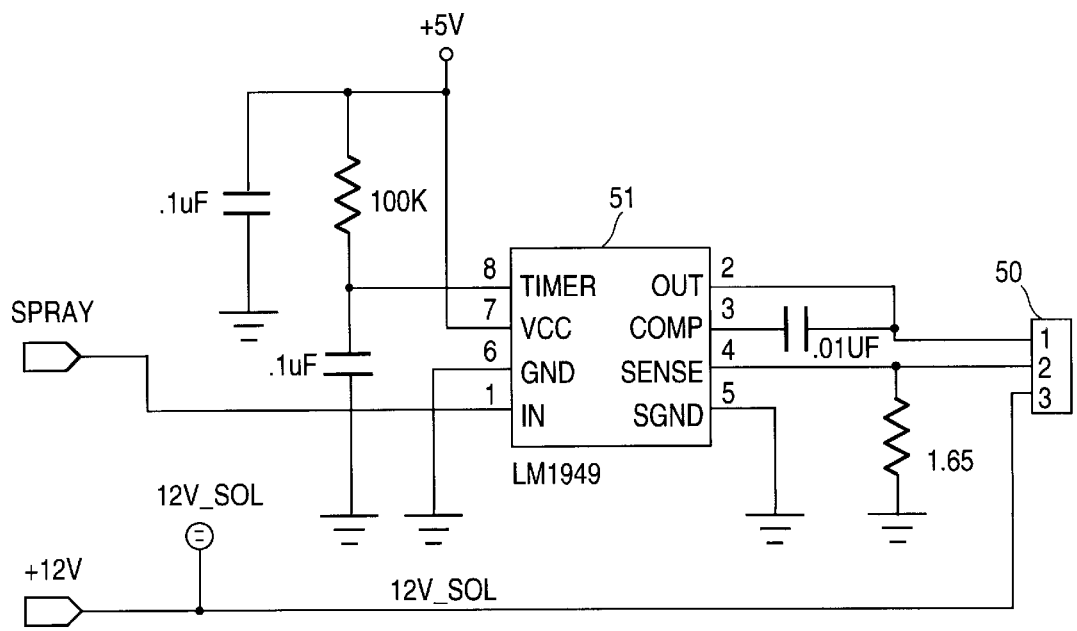

FIGS. 6A and 6B are schematic diagrams illustrating circuitry which drives the solenoid valve 31. FIG. 6A shows the circuitry disposed on printed circuit board 30. Connector 21 of FIG. 6A is coupled to connector 50 of FIG. 6B. Integrated circuit 51 is an LM1949 manufactured by National Semiconductor Corporation of Santa Clara, Calif. Integrated circuit 51 regulates the solenoid valve drive current by sensing the current flowing in the solenoid and providing the necessary control. The signal SPRAY is a digital signal which when high causes solenoid valve 31 to be opened and when low causes solenoid valve 31 to be closed.

FIG. 6C is a simplified diagram illustrating how light emitting diode 32 is driven in accordance with some embodiments when solenoid valve 31 is open. Rather than using a 12 volt solenoid valve, a 5 or 6 volt solenoid valve is used. To open the solenoid valve rapidly, a 12 volt pulse is supplied thereby providing a large amount of current to the solenoid valve winding. To maximize the amount of this current, current is not supplied to light emitting diode 32 during this time period. Once the solenoid valve has opened, only a smaller holding current (for example, 60 milliamperes) is required to keep the solenoid valve open. The voltage supplied to the solenoid valve winding is therefore reduced and current is allowed to flow through the light emitting diode 32. In the example of FIG. 6C, 30 milliamperes flows through the light emitting diode in the time period to the right of dashed line 52 when only the 60 milliamperes of solenoid valve holding current is supplied to the solenoid valve. Driving the light emitting diodes of the implement in this manner prevents the light emitting diodes from limiting the amount of peak current available to open the solenoid valves.

In a hooded spray system where the valve cartridges are disposed under hoods, it may be difficult or impossible for the operator (for example, in the cab of a tractor) to observe the LEDs 32 or to observe a flow of liquid from valve cartridges to make sure that each valve cartridge is operating properly. The solenoid valve 31 may be stuck open or closed and/or the nozzle may be plugged. Accordingly, an apparatus and method is desired for checking on the proper operation of the numerous valve/filter/nozzle cartridges of a spray implement.

Figures 7, 9A:
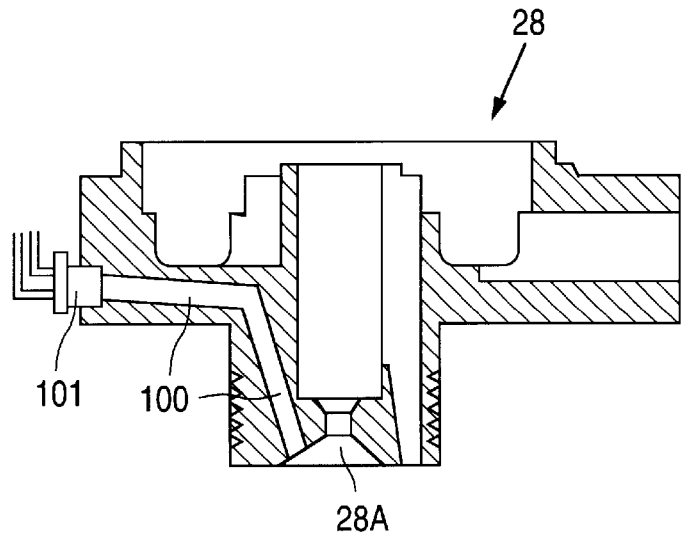
FIG. 7 is a cross-sectional diagram of a housing portion 28 in accordance with an embodiment of a valve/filter/nozzle cartridge.
FIG. 9A is a table of a set of solenoid commands and sensor readings conditions in accordance with another embodiment.

FIG. 7 is a cross-sectional diagram of a housing portion 28 in accordance with another embodiment of a valve/filter/nozzle cartridge. Housing portion 28 of FIG. 7 forms part of the housing 20 with the other housing portions 26, 27 and 29 as the housing portion 28 of FIGS. 4A–4C and 5 does. When the housing 20 is assembled to retain solenoid valve 31 and spray nozzle 24, a chamber is formed. This chamber is bounded on the top by the bottom of solenoid valve 31 (see FIG. 4B), on the sides by the sides of axial passage 40 (see FIG. 4B) in housing portion 27, on the sides by the sides of conical opening 28A (see FIG. 7) in housing portion 28, and on the bottom by the top of spray nozzle 24 (see FIG. 4B).

In the embodiment of FIG. 7, housing portion 28 has a channel 100 that extends from conical opening 28A near the spray nozzle to an integrated circuit pressure sensor 101. Pressure sensor 101 is therefore able to detect pressure changes in the chamber. In some embodiments, pressure sensor 101 is a SCC30G solid state pressure sensor packaged in a modified TO-5 can, glued to housing 28, and available from SenSym Inc. of Milpitas, Calif. For background on a pressure sensor, see the SenSym "Solid-State Pressure Sensors Handbook", vol. 15, pages iii–vi, 1-3 through 1-8, 8-51 through 8-54, and 8-66 through 8-77 (1996) (the subject matter of these pages of the SenSym Handbook is incorporated herein by reference).

Figure 8:
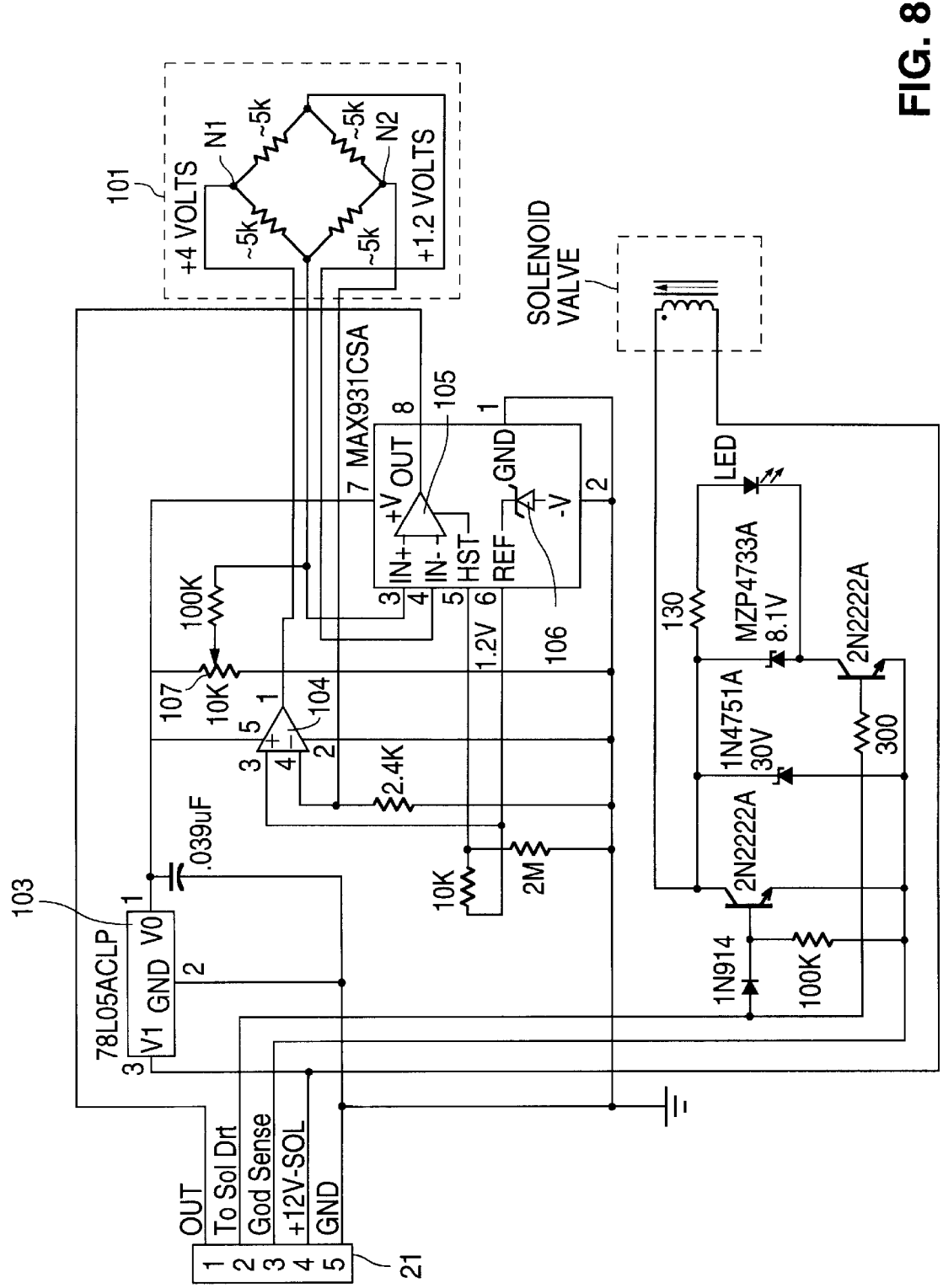
FIG. 8 is a schematic diagram of drive and control circuitry associated with the valve/filter/nozzle cartridge embodiment of FIG. 7.

FIG. 8 is a schematic diagram of circuitry associated with the valve/filter/nozzle cartridge in accordance with the pressure sensor embodiment of FIG. 7. An electrical equivalent of a particular embodiment of the pressure sensor is shown in dashed box 101. The drive and control circuitry includes connector 21 with five terminals, a 5 volt regulator 103, a constant current source circuit including an operational amplifier 104, a comparator 105, and a 1.2 volt voltage reference 106. A variable resistor 107 is provided to adjust a small bias current into the IN+ input of comparator 105 so that the voltage on the output of comparator 105 can be initialized to switch from a digital zero to a digital one when the pressure on pressure sensor 101 exceeds a predetermined pressure (for example, 15 PSI). Operational amplifier 104 supplies a current to node N1 of the pressure sensor 101 so that node N1 is maintained at about 4 volts. Voltage reference 106 maintains node N2 at approximately 1.2 volts. A differential pressure of about 30 PSI results in a differential voltage of approximately 50 mV on the input terminals IN+ and IN− (terminals 3 and 4) of comparator 105. Comparator 105 therefore outputs a digital signal that is low if the pressure in the chamber near spray nozzle is less than the predetermined pressure (for example, 15 PSI) and is high if the pressure in the chamber near spray nozzle is greater than the predetermined pressure(for example, 15 PSI). This signal is coupled via connector 21 to the electronics in the detector/spray assembly 16 (see FIG. 3). The bottom portion of FIG. 8 corresponds with FIG. 6A described above. In some embodiments, hysteresis may be provided to avoid high speed switching on the output of the comparator when the pressure in the chamber is near or at the predetermined pressure.

Figure 9:
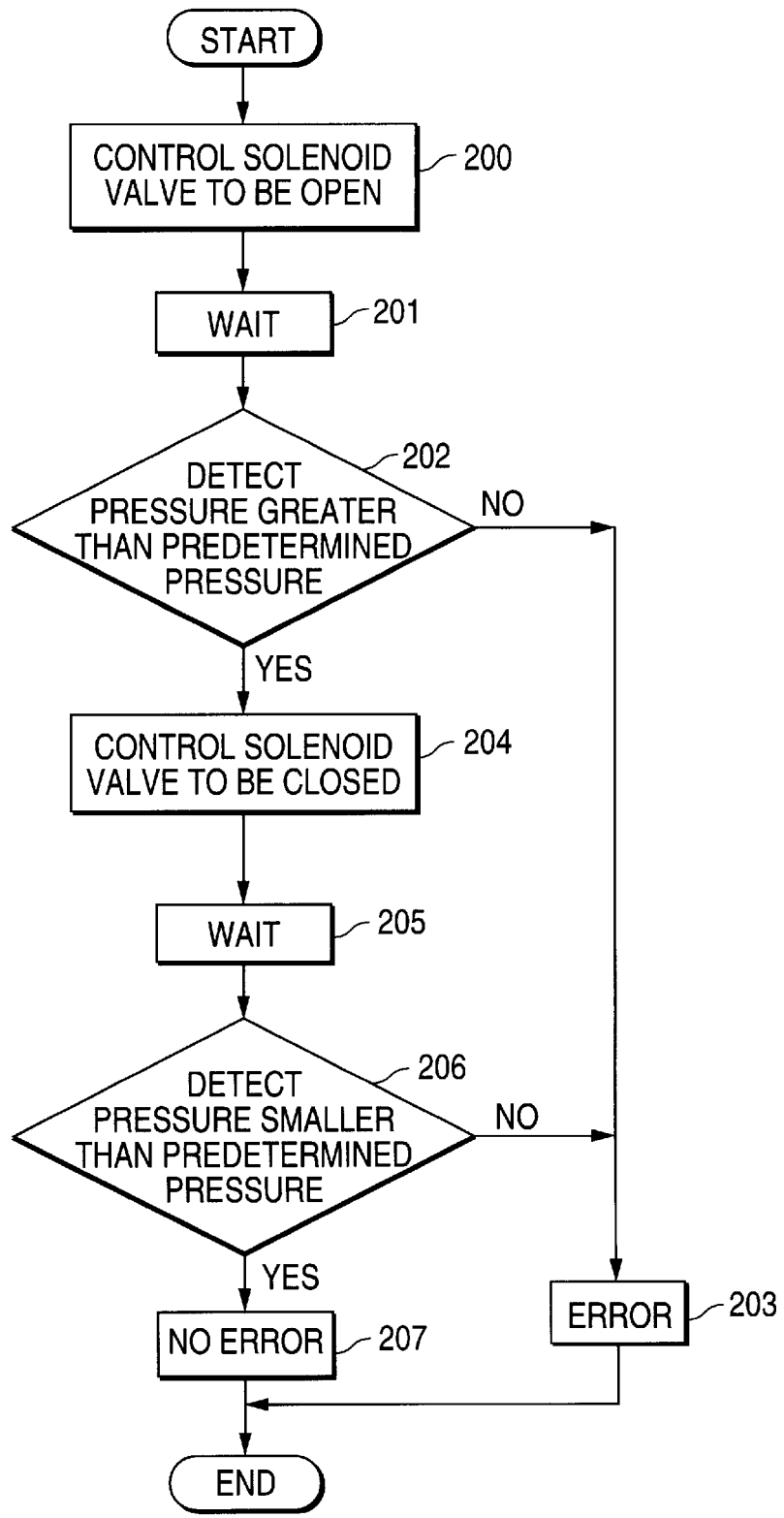
FIG. 9 is a flow chart illustrating a method for testing detector/spray assembly operation.

FIG. 9 is a flow chart illustrating one possible method to test the detector/spray assembly. In this method, the solenoid valve is first controlled to be open (step 200). A period of time (step 201) is then allowed for the solenoid valve to open, for the chamber to be filled with liquid, and for the pressure to increase in the chamber. The output of comparator 105 is then sampled (step 202) to determine if a pressure greater than the predetermined pressure exists in the chamber close to the nozzle. If a pressure greater than the predetermined pressure is not detected, then an error condition (step 203) is determined to have occurred with the detector/spray assembly. The error condition can be logged and/or displayed to the user. If, on the other hand, a pressure greater than the predetermined pressure is detected, then the solenoid valve is controlled to be closed (step 204). A period of time (step 205) is provided for the solenoid valve to close and for the pressure to drop in the chamber. The output of comparator 105 is then sampled (step 206) to determine if a pressure smaller than the predetermined pressure exists in the chamber close to the nozzle. If a pressure smaller than the predetermined pressure is not detected, then an error condition (step 203) is determined to have occurred with the detector/spray assembly. The error condition can be logged and/or displayed to the user. If, on the other hand, a pressure smaller than the predetermined pressure is detected, then no error condition (step 207) is determined to have occurred. The proper operation of the detector/spray assembly can be logged and/or displayed to the user.

The method illustrated in FIG. 9 is merely illustrative of a method to test and/or monitor operation of a detector/spray assembly. For example, a test method can be performed to make sure that the digital signal output from comparator 105 changes when the solenoid valve is controlled to be closed and then is controlled to be open.

FIG. 9A is a table of a set of solenoid commands and sensor readings conditions. Some of these conditions are indicative of error conditions whereas others are not. In some embodiments, an error condition is determined to have occurred in accordance with the conditions in a table such as this without necessarily causing the solenoid valve to open and close as in the method of FIG. 9. For example, if the solenoid valve is controlled to be open but the sensor detects a pressure below a predetermined pressure (i.e., the "set point"), then an error condition is displayed or otherwise signaled to the user. Note that this condition would exist if the solenoid valve were stuck in the closed position (i.e., "off") and/or if the nozzle were missing such that a high pressure could not be attained. In either of these cases, however, there would be an error condition, so the display of an error condition would be appropriate.

In some embodiments, a central cab control unit visible to the operator (for example, disposed in the cab of a tractor pulling a spray implement) communicates with many detector/spray assemblies via a serial bus. For details on one suitable serial bus, see U.S. Pat. No. 5,809,440 entitled "An Agricultural Implement Having Multiple Agents For Mapping Fields", filed Feb. 27, 1997 (the subject matter of which is incorporated herein by reference).

Figure 10A:
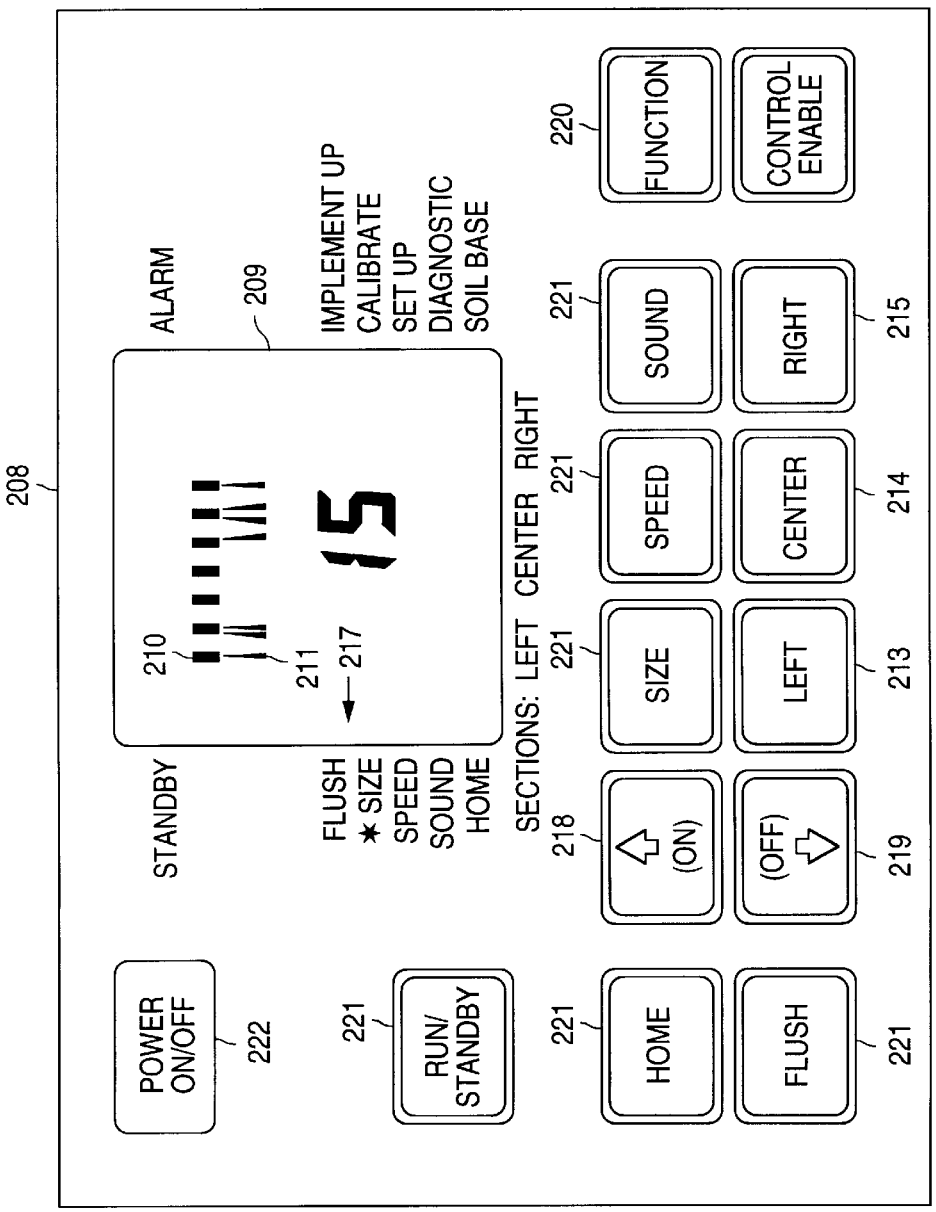
Figure 10B:
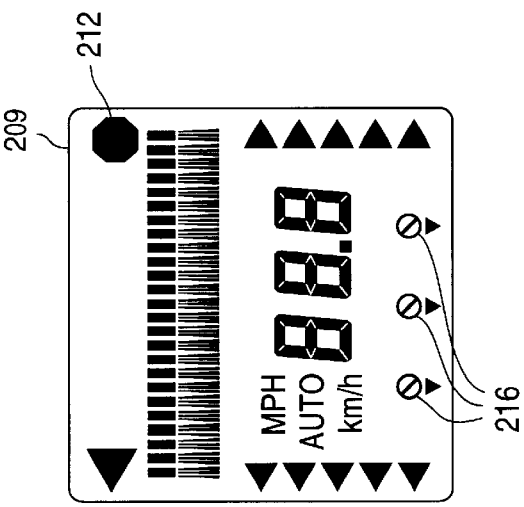
FIG. 10B is a diagram of the LCD display of FIG. 10A showing all the LCD sections.

FIG. 10A is a diagram of the face 208 of a cab control unit coupled to the detector/spray assemblies of the seven spray hood system of FIG. 2. The face of the cab control unit includes a plurality of push keys (on the left side and bottom side of the face) as well as a liquid crystal display (LCD) display 209 (in the center and upper right of the face). The LCD display 209 has many sections that can be selectively turned on and off. FIG. 10A shows the cab control unit in normal operation where only some of the LCD sections are visible. FIG. 10B shows all of the LCD sections of the LCD display 209.

The row of seven rectangular icons 210 in FIG. 10A represents the seven hoods of the system of FIG. 2. The spray jet icons 211 underneath a rectangular icon of a particular hood represent the detector/spray assemblies under that particular hood. When a solenoid spray valve of detector/spray assembly is detected to be open, then the spray jet icon associated with that detector/spray assembly is made visible. This gives the operator an indication of whether that detector/spray assembly is detecting and spraying weeds. In a normal field when some of the soil is covered with weeds and some is bare, the spray jet icon of each detector/spray assembly should be flickering on and off as the agricultural implement moves across the field.

If an alarm condition is detected in a particular detector/spray assembly, then an alarm condition is indicated to the user. In one embodiment, the spray jet icon associated with that detector/spray assembly can be made to flash at faster rate so that it will stand out from the spray jet icons of detector/spray assemblies that are operating normally. In some embodiments, the spray jet icon associated with that detector/spray assembly can have two different colors, one for indicating normal operation and the other indicating an error condition. Alternatively, or in addition, an alarm icon such as a stop sign symbol 212 can be provided. The stop signal symbol 212 is flashed on and off to indicate an alarm condition with one or more of the detector/spray assemblies.

When the operator notices the alarm condition, the operator can identify the detector/spray assembly with the problem and take corrective action. For example, a clogged valve/filter/nozzle cartridge can be unplugged and replaced.

FIGS. 10A and 10B illustrate that only some of the many detector/spray assembly icons available on the LCD display (see FIG. 10B) are used in the seven spray hood embodiment (see FIG. 10A). The large number of detector/spray icons provided on the LCD display allows the cab control unit to support multiple configurations of detector/spray assemblies. For large systems having more detector/spray assemblies than corresponding icons, the icons correspond with a section of the detector/spray assemblies. The user can monitor a particular section of detector/spray assemblies by pushing the corresponding "LEFT" (213), "CENTER" (214) or "RIGHT" (215) punch key. One of the corresponding LCD icons 216 is activated to indicate the section being monitored.

The user can move the cursor 217 about the LCD display 209 using up and down punch keys 218 and 219 and function select punch key 220 to select different functions as indicated by the text to which the cursor points. Some of the functions can be selected directly using dedicated punch keys 221. Power can be turned on and off to the spray system using power ON/OFF punch key 222. Activating the "SOUND" function causes a buzzer to be activated upon an error condition in addition to be visible indications set forth above. Pushing the "FLUSH" button causes all solenoid valves to open to flush the system.

Although the present invention is described in connection with certain specific embodiments for instructional purposes, the present invention is not limited thereto. The terms up and down, top and bottom are relative to one another and are otherwise not limiting. Numerous different filters can be included in the valve/filter/nozzle cartridge and different filter types and forms of filters are possible. The described pressure sensor and associated circuitry is merely illustrative. Other suitable pressure sensors, chambers, and pressure sensor circuitry can be employed. Advantages in accordance with the invention can be achieved without the use of magnetized filters.

Advantages in accordance with the invention can be achieved without providing a spray nozzle in the cartridge. Accordingly, various configurations, modifications, adaptations, and combinations of various features of the described embodiments can be practiced without departing from the scope of the invention as set forth in the following claims.

What is claimed is:

1. A spray implement, comprising a plurality of valve assemblies, each of the valve assemblies comprising:
    a solenoid valve capable of opening in less than 10 milliseconds;
    a spray nozzle;
    a housing having a chamber, the chamber extending from the solenoid valve to the spray nozzle;
    a pressure sensor disposed to detect a pressure in the chamber, and
    an error detection system coupled to receive a signal from the pressure sensor, the error detection system capable of detecting an error in the valve assembly operation based on the signal from the pressure sensor.

2. The spray implement of claim 1, wherein the signal from the pressure sensor of each of the valve assemblies is indicative of a pressure in the chamber of the valve assembly.

3. The spray implement of claim 2, wherein the signal is a digital signal.

4. The spray implement of claim 3, wherein the digital signal has a first digital value if the pressure detector detects a pressure greater than a predetermined pressure, and wherein the signal has a second digital value otherwise.

5. The spray implement of claim 1, further comprising:
    a display having a plurality of symbols, a respective one of the plurality of symbols being associated with a corresponding respective one of the plurality of valve assemblies.

6. The spray implement of claim 5, wherein the symbol associated with a valve assembly represents the valve assembly in a first way when the error detection system does not detect an error, and wherein the symbol associated with a valve assembly represents the valve assembly in a second way when the error detection system does detect an error.

7. The spray implement of claim 6, wherein the first way involves flickering the symbol on and off at a rate corresponding with a rate at which the solenoid valve inside the valve assembly is controlled to turn on and off.

8. The spray implement of claim 1, wherein the spray implement further comprises a frame structure and a plurality of spray hoods, each of the spray hoods covering at least one of the valve assemblies.

9. The spray implement of claim 1, further comprising:
    a display having a symbol which is turned on when there is a fault condition in any one or more of the valve assemblies.

10. The spray implement of claim 9, wherein the symbol has an octagonal shape.

11. The spray implement of claim 6, wherein the error detection system does not detect an error when the pressure sensor detects the pressure in the chamber of the valve assembly to have changed properly, and wherein the error detection system does detect an err when the pressure sensor does not detect the pressure in the chamber of the valve assembly to have changed properly.

12. The spray implement of claim 11, wherein the pressure in the chamber of the valve assembly changes properly by attaining a low pressure when the valve assembly is in an open position and attaining a high pressure when the valve assembly is in a closed position.

13. The spray implement of claim 1, wherein each of the valve assemblies is associated with a respective pair of light sources of the spray implement, one of the light sources of each pair emitting substantially monochromatic light of a first wavelength, the other of the light sources of each pair emitting substantially monochromatic light of a second wavelength, light of the first and second wavelengths reflecting off a surface of a field and being detected on a photodetector of the spray implement such that living plants in the field are distinguished from bare soil based on different spectral reflectance characteristics of living plants and soil.

14. A method of applying an agricultural liquid to a field, comprising:
    controlling a solenoid valve of a valve assembly of an agricultural spray implement to be open, the agricultural spray implement having a plurality of such valve assemblies and a central control unit, each of the valve assemblies having a solenoid valve, a nozzle, and a pressure sensor, the pressure sensor of each valve assembly detecting a pressure at the nozzle of that valve assembly;
    detecting whether the pressure at the nozzle is less than a predetermined pressure when the valve is controlled to be open;
    displaying an error condition on the central control unit if the pressure at the nozzle is less than the predetermined pressure; and
    moving the agricultural spray assembly over the field.

15. A method, comprising:
    controlling a solenoid valve of an agricultural spray implement to be closed and then open, the solenoid valve being capable of opening in less than 10 milliseconds, the solenoid valve being capable of closing in less than 10 milliseconds;
    determining whether the agricultural spray implement has malfunctioned based on whether a pressure at a nozzle associated with the solenoid valve changed; and
    moving the agricultural spray implement across a field, the agricultural spray implement comprising a plurality of such solenoid valves.

16. The method of claim 15, further comprising:
    if the agricultural spray implement has malfunctioned, indicating a failure condition on a display of the agricultural spray implement.

17. A method, comprising:
    controlling a solenoid valve of an agricultural spray implement to be open and then closed, the solenoid valve being capable of opening in less than 10 milliseconds, the solenoid valve being capable of closing in less than 10 milliseconds;

determining whether a pressure at a nozzle associated with the solenoid valve changed;

determining whether the agricultural spray implement has malfunctioned based on the pressure at the nozzle; and moving the agricultural spray implement across a field, the agricultural spray implement comprising a plurality of such solenoid valves.

18. The method of claim 7, further comprising:

if the agricultural spray implement has malfunctioned, indicating a failure condition on a display of the agricultural spray implement.

* * * * *